March 25, 1941.     V. O. BEAM     2,236,360
WATER LEVEL CONTROL FOR BOILERS
Filed April 10, 1937     2 Sheets-Sheet 1
Fig. 1
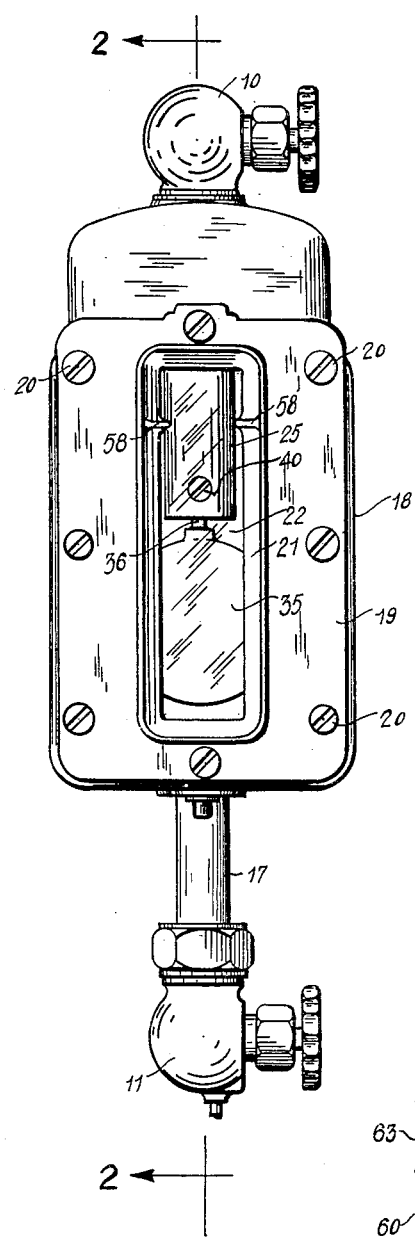
Fig. 2
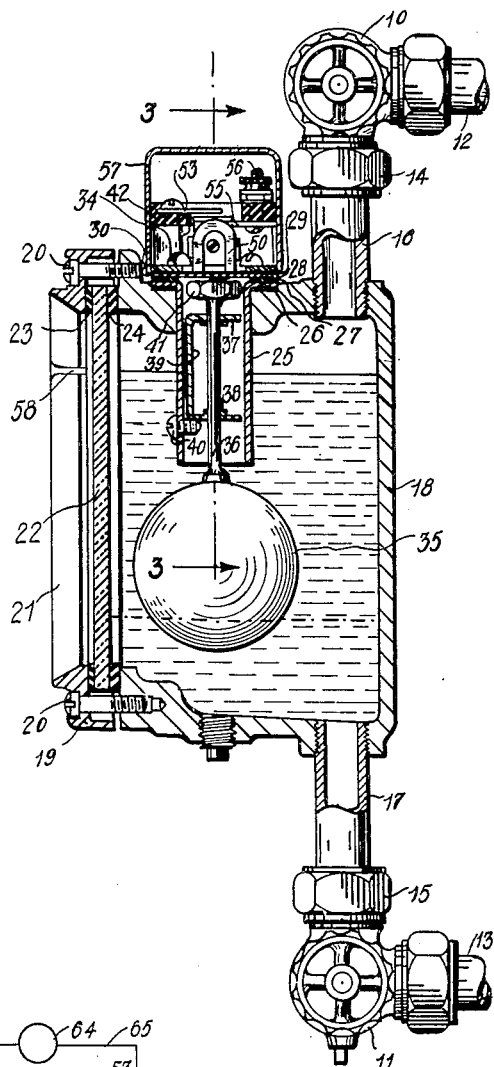
Fig. 5
INVENTOR.
VILYNN O. BEAM
BY Kwis Hudson & Kent
ATTORNEYS March 25, 1941.  V. O. BEAM  2,236,360

WATER LEVEL CONTROL FOR BOILERS

Filed April 10, 1937  2 Sheets-Sheet 2

INVENTOR.
VILYNN O. BEAM
BY Kwis Hudson & Kent
ATTORNEYS

Patented Mar. 25, 1941

2,236,360

UNITED STATES PATENT OFFICE 2,236,360

WATER LEVEL CONTROL FOR BOILERS

Vilynn O. Beam, Cleveland Heights, Ohio, assignor to The Bryant Heater Company, Cleveland, Ohio, a corporation of Ohio Application April 10, 1937, Serial No. 136,120

2 Claims. (Cl. 200—84)

This invention relates to improvements in water level controls for boilers, and has reference particularly to apparatus in which the float chamber is sealed and an electrical control mechanism is actuated magnetically through a diagrammatic portion of the float chamber casing.

One of the objects of the invention is the provision of a device of this character wherein there are no moving parts extending through the casing, thereby doing away with packings for such parts.

Another object is the provision of a device for the purpose stated which shall be capable of being substituted for the conventional gauge glass of a domestic heating boiler.

A further object of the invention is the provision of means for trapping air in a small compartment at the top of the float chamber and locating in that compartment one of the magnetic elements which constitute a part of the operating means, whereby that element will be protected against contact with the water in the float chamber.

Other objects and features of novelty will appear as I proceed with the description of that embodiment of the invention which, for the purposes of the present application, I have illustrated in the accompanying drawings, in which Fig. 1 is a front elevational view of a float operated control apparatus built in acordance with the invention.

Fig. 2 is a view principally in vertical section taken substantially on the line 2—2 of Fig. 1.

Fig. 5 is a diagram of electric circuits which may be employed in connection with the invention.

Similar reference characters apply to like parts throughout the views.

Figure 4:
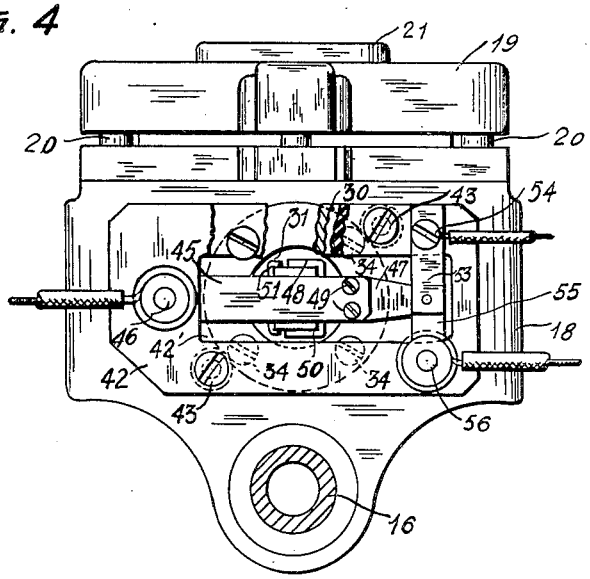
Fig. 4 is a plan view of the same with the switch box cover removed and certain parts broken away.

In the drawings I have illustrated at 10 and 11 conventional upper and lower gauge glass fittings such as are commonly used upon domestic heating boilers, these fittings being threaded upon pipes 12 and 13 respectively projecting outwardly from a heating boiler in vertical alignment. These fittings further comprise nuts 14 and 15 by means of which the ends of a conventional gauge glass of tubular form may be mounted.

My apparatus is adapted to be installed in the place of such a conventional gauge glass, and for this purpose it comprises two metallic pipe sections 16 and 17 of the same external diameter as the conventional gauge glass, which are threaded into aligned holes in the upper and lower walls, respectively, of the main casing 18 of the apparatus. The combined length of the casing and the two pipe sections 16 and 17 is the same as the length of the conventional gauge glass. Hence the gauge glass of a boiler may be removed and the present apparatus inserted in its place readily and quickly.

The front wall 19 of the casing 18 is a separate member secured to the body of the casing by screws 20. It is provided with a bezel 21 surrounding a vertically elongated opening behind which is mounted a flat gauge glass 22. Suitable means for sealing the joints around the glass 22 are provided, consisting preferably of gaskets 23 and 24.

In the top wall of the casing there is a circular opening into which is fitted a sleeve 25 with an outwardly extending flange at its upper end. Between this flange and the casing there is an annular gasket 26. Above the flange there is a similar gasket 27, over which is placed a thin closure or diaphragm of non-magnetic material. Preferably this diaphragm is made of two layers, that is a bottom layer or disc 28 of non-magnetic metal, such for instance as brass, and an upper layer or disc 29 of heavy paper or other fibrous material. On top of this diaphragm I mount the base 30 of a switch box, this base having a central opening 31 aligned with the opening in the casing, and small openings 32 and 33 through which electrical conductors may be caused to enter the box. Screws 34 extend through openings in base 30, diaphragm 29, 28, gasket 27, the flange of sleeve 25 and gasket 26 into threaded openings in the casing, thereby compressing the gaskets and sealing the joints between the casing and the sleeve as well as between the sleeve and the diaphragm.

A ball float 35 within the casing is threadably attached to the lower end of a stem 36 which projects through guiding holes in two circular discs 37 and 38 spaced by an integrally formed connecting member 39. This guide assembly is merely inserted upwardly into the sleeve 25, and thereafter a screw 40 is threaded into a hole in the sleeve beneath disc 38 for supporting the assembly. On the upper end of stem 36 there is mounted, preferably by a threaded connection, an iron armature 41 of a size to move freely within the sleeve. Its movement is of course limited by the diaphragm 28, 29 and the disc 37.

Figure 3:
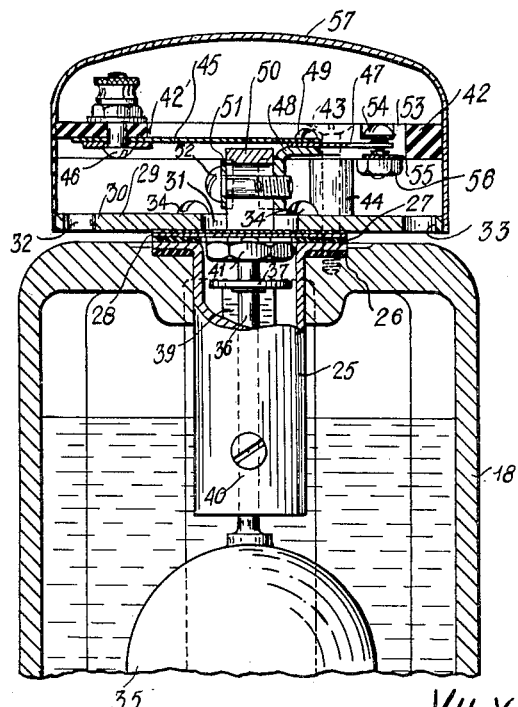
Fig. 3 is a fragmental vertical sectional view taken substantially on the line 3—3 of Fig. 2, and showing the parts on a larger scale.

A slab of insulation 42 with a large rectangular opening 42' in the middle thereof, is mounted in the switch box above the base 30. In the mounting of this slab I may utilize screws 43 which project through holes in the slab, through spaced blocks 44 and through holes in the base 30 into threaded openings in the casing 18. A flat spring finger 45 of electrical conducting material is firmly anchored to the slab 42 at one end thereof, as by means of a bolt 46, the upper end of which serves as a connecting post. This finger projects into the opening 42' of the slab. At its opposite end finger 45 carries an extension 47 and bracket 48, all held together by a pair of screws 49. The bracket 48, besides the horizontal arm by which it is attached to finger 45, comprises a vertically arranged channel portion, as will be apparent from Fig. 4. This channel portion receives a permanent magnet 50 of inverted U-shape. The magnet is held in the bracket, by means of a clamping plate 51 through which extends a screw 52 that is threaded into the bracket 48, as illustrated in Fig. 3. The magnet is thus carried by the spring finger 45, and it is so adjusted vertically as to stand a little above the diaphragm 28, 29 when not affected by armature 41.

The finger 45 and its extension 47 together constitute the movable blade of a switch. Two fixed blades cooperate with the movable blade, one such fixed blade 53 being mounted at one side of slab 42 by means of a screw 54 and extending inwardly to a point above the end of extension 47. The other fixed blade 55 is attached to the lower surface of slab 42 on the opposite side thereof by means of a bolt 56, and extends inwardly to a point beneath extension 47. When magnetic attraction between magnet 50 and armature 41 causes these parts to come together, that is except for the diaphragm between them, the movable extension blade is pulled down so as to make contact with blade 55. When however this attraction is broken by the descent of armature 41 the spring finger 45 rises, due to its resiliency, and the movable switch blade makes contact with the upper blade 53.

When the parts are all assembled and the electrical connections made a cover 57 is placed over the slab 42 and the base 30 and removably secured thereto by suitable means so as to completely enclose and protect the switch and associated parts.

The proper high level of water is indicated by the ribs 58 on bezel 21. Whenever the level is at this point or somewhat lower the float holds armature 41 up against the lower surface of diaphragm 28, 29. There is then a mutual attraction between magnet 50 and armature 41 and the movable switch blade is drawn down into contact with fixed blade 55. Assuming that the proper electrical connections are made to binding posts 46 and 56, and that any other controls in the line are in operative position, a circuit is thereby set up through the control for the fuel supply to the boiler. This control may be an electric motor operated pump, or it may be a valve in a gas supply line moved to open position by a solenoid or a motor. In Fig. 5 I have indicated at 59 any suitable fuel supply control, a conductor 60 connecting this control with a source of electricity 61, and a switch 62 which represents any manual or automatic control of the feed line, as for instance a switch operated by a room thermostat. Obviously, when the switch 62 is closed and the switch blade 47 is held down against blade 55 a circuit will be set up through the fuel feed apparatus or control 59, and fuel will be fed to the burner.

It is contemplated of course that switch blades 47 and 55 will remain in contact almost continuously. However, if and when the level of water in the boiler falls sufficiently to lower the float 35 to a predetermined low point, the attraction between armature 41 and magnet 50 will be so weakened that the resilience of spring finger 45 will overcome it and the magnet 50 will spring up, separating switch blades 47 and 55. The supply of fuel will then be interrupted and will continue interrupted until the water level is again raised. Replenishment of the water may be accomplished by the manual operation of a valve in a water feed line, or it may be accomplished, as indicated in Fig. 5, automatically. In that figure I have shown a conductor 63 between source of electricity 61 and a water feed control 64, and a conductor 65 extending from the latter control to the binding post 54. The control 64 may be an electrically operated valve for opening a service water line, or it may be an electrically operated pump by means of which water is supplied to the boiler. As soon as contact is made between switch blades 47 and 53 this water control functions and water begins to flow into the boiler. It continues to do so until the water level rises sufficiently to bring armature 41 up against the diaphragm, when the magnetic attraction of the magnet for the armature overcomes the resiliency of spring finger 45, and the magnet again takes its lower position, the water supply control circuit is broken and the circuit through the fuel control is again completed.

It will be observed therefore that it is impossible for the burner to continue to operate if for any reason whatever the supply of water in the boiler is diminished to an extent such that the level is below a predetermined safe point, thereby avoiding the damage and interruption to service which would occur if the boiler ran dry. It will also be observed that the glass 22 in the front wall of the casing makes the water level visible to the operator in the same way as the conventional gauge glass which is displaced by the present apparatus.

While the location of the magnet above the diaphragm 28, 29, and the armature below the diaphragm is the preferred arrangement, it will be appreciated that in accordance with the broader aspects of the invention, these two parts may be interchanged.

Having thus described my invention, I claim:

1. In a device of the character described, a casing, means for connecting said casing to a boiler above and below the water level thereof, said casing having an opening in the top thereof, a thin non-magnetic closure for said opening, a sleeve extending downwardly from the top of the casing axially with said opening and terminating below the water level, a switch above the closure, a float in the casing, upper and lower magnetic elements comprising a permanent magnet and an armature, the upper magnetic element being operatively connected with said switch and the lower magnetic element being operatively connected with the float and arranged within said sleeve, and guiding means for the lower magnetic element in said sleeve comprising a pair of vertically spaced guide members arranged above the lower end of the sleeve, said sleeve serving also to provide an air pocket for the protection of the lower magnetic element and the guide means.

2. In a device of the character described, a casing, means for connecting said casing to a boiler above and below the water level thereof, a sleeve secured to the top of the casing and extending downward therefrom, a float in the casing, a stem attached to said float and extending upwardly into said sleeve, guiding means for said stem comprising two spaced disks perforated to receive the stem and loosely engaging the walls of the sleeve, said disks being connected together by an upright member, a removable stop mounted in the wall of the sleeve beneath one of said disks for removably supporting said guiding means, and control means above the casing adapted to be set in operation by the vertical movements of said float and stem.

VILYNN O. BEAM.